(12) United States Patent
Svendsen et al.

(10) Patent No.: US 7,520,517 B2
(45) Date of Patent: Apr. 21, 2009

(54) LEAF SPRING ASSEMBLY HAVING SAFETY SPRING WITH RETAINING ELEMENTS

(75) Inventors: Melvin Svendsen, Calgary (CA); Donald Stoesz, Langdon (CA); Marty Boll, Calgary (CA)

(73) Assignee: Standens Ltd., Calgary (CA)

( * ) Notice: Subject to any disclaimer, the term of this patent is extended or adjusted under 35 U.S.C. 154(b) by 331 days.

(21) Appl. No.: 11/491,518

(22) Filed: Jul. 24, 2006

(65) Prior Publication Data
US 2007/0057423 A1   Mar. 15, 2007

Related U.S. Application Data

(60) Provisional application No. 60/716,521, filed on Sep. 14, 2005.

(51) Int. Cl.
*B60G 11/113* (2006.01)
(52) U.S. Cl. ............................ 280/124.175; 280/686; 267/53; 267/51; 267/260
(58) Field of Classification Search .......... 280/124.175, 280/676, 686, 104, 680; 267/51, 52, 53, 267/37.1, 47, 260, 38
See application file for complete search history.

(56) References Cited

U.S. PATENT DOCUMENTS

| 1,013,774 | A | * | 1/1912 | Hodges | 267/260 |
|---|---|---|---|---|---|
| 1,064,161 | A | * | 6/1913 | Newkirk | 267/47 |
| 1,120,671 | A | * | 12/1914 | Bateman | 267/47 |
| 1,262,252 | A | * | 4/1918 | Pine | 267/48 |
| 1,523,376 | A | * | 1/1925 | Beran | 267/53 |
| 1,781,631 | A | * | 11/1930 | Fageol | 267/48 |
| 1,791,252 | A | * | 2/1931 | Tibbetts | 267/37.1 |
| 1,814,682 | A | * | 7/1931 | Frost | 267/47 |
| 1,922,001 | A | * | 8/1933 | Goltry | 267/47 |
| 3,494,609 | A | * | 2/1970 | Harbers, Jr. | 267/52 |
| 3,578,355 | A | * | 5/1971 | Oeder | 280/124.163 |
| 4,022,449 | A | * | 5/1977 | Estorff | 267/48 |
| 4,630,804 | A | * | 12/1986 | Fesko | 267/52 |

* cited by examiner

*Primary Examiner*—Eric Culbreth
*Assistant Examiner*—Nicole Verley
(74) *Attorney, Agent, or Firm*—Ade & Company Inc.; Kyle R. Satterthwaite; Ryan W. Dupuis

(57) ABSTRACT

A leaf spring assembly features a stack of leaf springs having mounting couplings attached at opposite ends. The mounting couplings each have first and second mounting elements clamped together about at least a main spring and a safety spring. The safety spring has retaining elements at opposite ends each having an extension portion and a blocking portion. The extension portion extends past the end of the main spring. Here the blocking portion extends generally perpendicularly from the extension portion to block motion of the mounting coupling should failure cause it to be detached from the stack of springs. This ensures that failure does not cause complete separation of the spring stack and mounting couplings.

13 Claims, 2 Drawing Sheets

LEAF SPRING ASSEMBLY HAVING SAFETY SPRING WITH RETAINING ELEMENTS

This application claims benefit of U.S. provisional application 60/716,521 filed Sep. 14, 2005.

This invention relates to leaf spring suspension assemblies, and more particularly to a way to maintain connection between a stack of leaf springs and mounts coupled to a main spring at either end of the stack should the main leaf fail.

BACKGROUND OF THE INVENTION

Leaf spring assemblies are conventionally used for suspending one component relative to another. Vehicle suspension is one example of an application using such assemblies. However a leaf spring assembly can be used in many different situations and the present invention is applicable to any of these and is not intended to be limited to vehicle suspensions.

Single point suspension systems are often utilized in heavy duty truck and trailer suspension systems. These systems typically use leaf spring assemblies featuring a plurality of individual leaf springs stacked one atop the other and connected together at approximately a center point along their length. The stack of leaf springs is connected to the frame at this center point, for example by a trunnion. At each end of the stack of springs the main leaf is connected to an axle by means of a cast or fabricated mount. These axle seats are often located on the spring stack by dowels extending into corresponding holes through the main leaf. These axle seats are typically open at the end of the spring stack in order to allow for interleaf movement.

In the event of failure of the main leaf or the dowels, the attachment would become unstable and could result in the axle coming free from the vehicle on which the leaf spring assembly is mounted as a result of the open ends. There is a demand for a safety device that compliments the locating of the mounts, for example by the dowels, by further securing the mounts to the stack of leaf springs.

SUMMARY OF THE INVENTION

According to a first aspect of the invention there is provided a leaf spring assembly comprising:

a plurality of leaf springs held in a stacked relationship, said plurality of leaf springs comprising a main spring and a safety spring, each spring having opposite first and second surfaces and opposite ends, said springs being vertically stacked first surface to second surface and the first surface of said main spring being opposite said safety spring;

mounting couplings coupled to the main spring at opposite ends thereof, each mounting coupling comprising:

a first mounting element coupled to the main spring and disposed against the first surface thereof; and a second mounting element disposed to a side of the safety spring opposite said main spring in opposition to said first mounting element;

said first and second mounting elements being clamped together with at least the main and safety springs therebetween; and retaining elements each disposed at a respective one of the opposite ends of said safety spring, each of said retaining elements comprising:

an extension portion extending to a respective one of the opposite ends of the main spring; and a blocking portion extending from the extension portion at least one of a first vertical distance to a first side of said extension portion and a second vertical distance to a second side of said extension portion, said first and second vertical distances being respectively greater than a first vertical space between said extension portion and said first mounting element and a second vertical space between said extension portion and said second mounting element;

the blocking portions of the retaining elements thereby being arranged to block movement of the mounting couplings longitudinally off the plurality of leaf springs should at least one of the opposite ends of the main spring break off or at least one of said mounting couplings become uncoupled from said main spring.

The retaining elements at each end of the safety spring in the stack of leaf springs block the main leaf and the mounting couplings so that they cannot slide off the end of the stack in the event of failure. The safety leaf thereby reduces the safety risk associated with leaf spring failure without having to add extra components to the assembly outside of the stack. The safety spring is located somewhere in the stack between the first and second mounting elements of the mounting couplings. The blocking portion of each retaining element can extend upward and/or downward from the extension portion to block the first and/or second mounting element of the respective mounting coupling.

Preferably the first and second mounting elements of each mounting coupling are clamped together by bolts.

Preferably each first mounting element comprises a dowel plate having a dowel and the main spring has holes therein, each hole receiving a respective one of the dowels for coupling said first mounting element and said main spring.

Preferably each second mounting element is disposed against the second surface of the safety spring.

The plurality of stacked leaf springs may further comprise a third spring disposed at the side of the safety spring opposite the main spring. In this case the second mounting element of each mounting coupling is disposed against the second surface of the third spring. Alternatively, the plurality of leaf springs may further comprise a third spring between the main spring and the safety spring.

Preferably there are provided axles.

Preferably the first mounting element of each mounting coupling comprises a cradle for engaging a side face of a respective one of the axles and the bolts comprise U-bolts which engage around the axle to clamp the cradle between the axle and the second mounting element.

Preferably the second mounting element of each mounting coupling comprises a channel member extending parallel to a longitudinal axis of the plurality of leaf springs.

Preferably each channel member comprises side walls, the respective ends of at least the safety and main springs being received between said side walls, said side walls extending to the first mounting element for clamping connection thereto on opposite sides of the plurality of stacked leaf springs.

Preferably the second mounting element of each mounting coupling further comprises rubber pads disposed between the channel member and the safety spring.

Preferably the retaining elements are integral to the safety spring.

Preferably the blocking portion of each retaining element extends from the extension portion of said retaining element toward the first mounting element of the mounting coupling at the respective end of the main spring. Alternatively, the blocking portion of each retaining element may extend from the extension portion of said retaining element toward the second mounting element of the mounting coupling at the respective end of the main spring. As a further alternative, the blocking portion of each retaining element extends between the first and second mounting elements of the mounting coupling at the respective end of the main spring.

BRIEF DESCRIPTION OF THE DRAWINGS

In the accompanying drawings, which illustrate an exemplary embodiment of the present invention.

DETAILED DESCRIPTION

Figure 1:
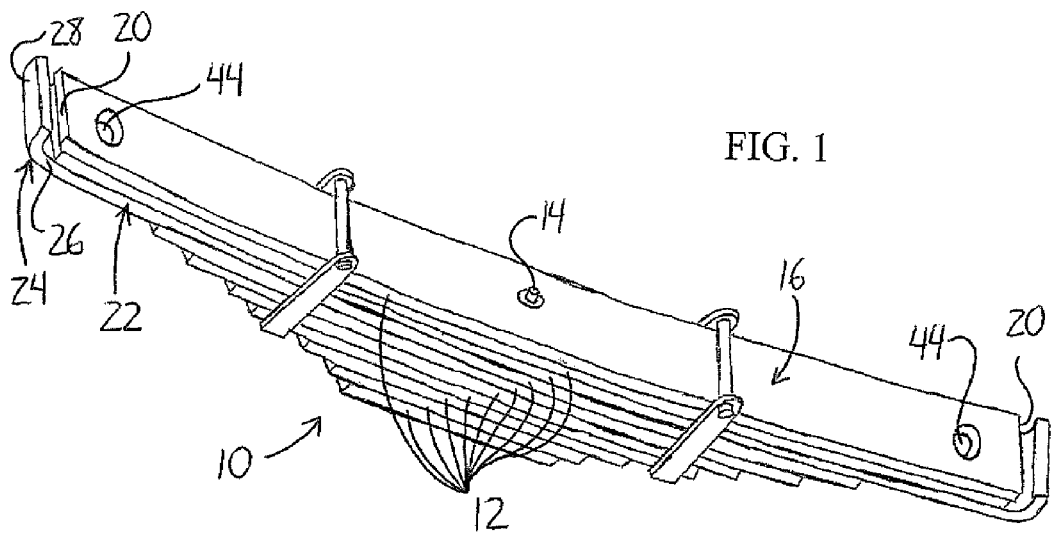
FIG. 1 is an isometric view of a leaf spring stack having a safety spring with retaining elements at either end.

FIG. 1 shows a stack 10 of leaf springs 12 according to the present invention. The stack 10 is made up of progressively shorter leaf springs 12 which are held in the stacked relationship by a fastener 14 located centrally between the ends 20 of each spring 12. Located two springs down from a top or main spring 16 is a safety spring 22 which breaks from the pattern progressively shorter springs 12 moving downward from the top spring 16. At either end 20 of the safety spring 22 is a retaining element 24 having an extension portion 26 and a blocking portion 28. The extension portion 26 simply extends the length of the safety spring 22 out past the end 20 of the top spring 16. The blocking portion extends upward from the extension portion past the top spring 16 so as to block its ends 20. These retaining elements 24 are integral parts of the safety spring 22.

Figure 2:
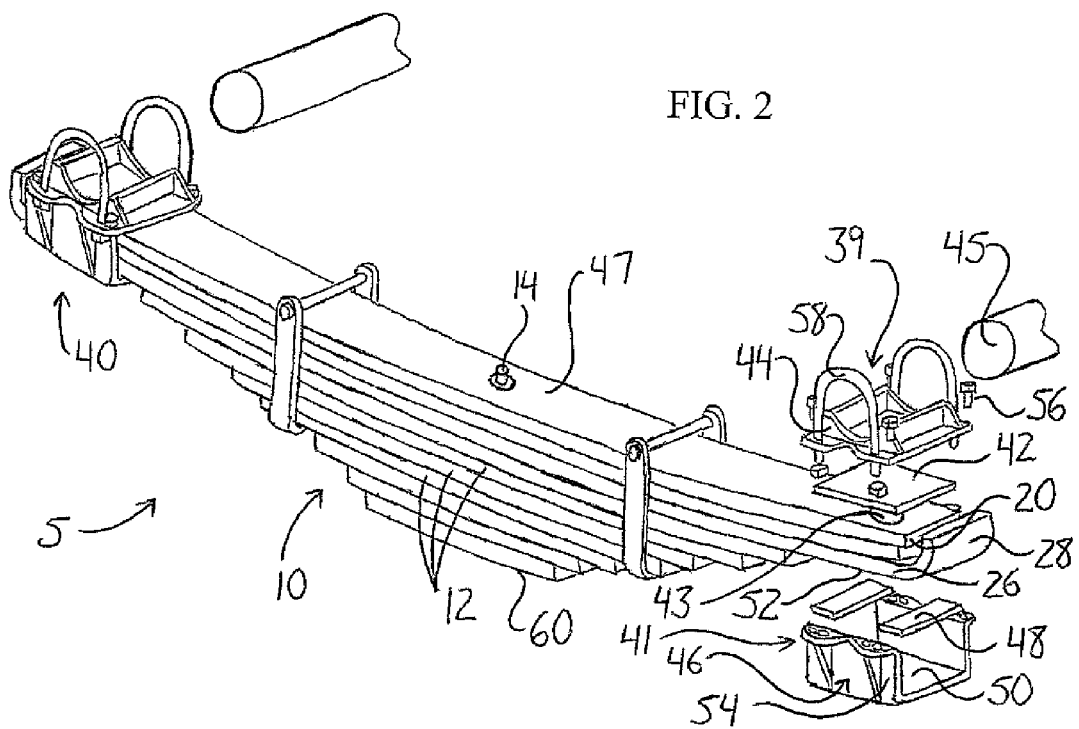
FIG. 2 is an isometric view of the leaf spring stack of FIG. 1 having mounting couplings at either end of a top spring for connection to respective axles.

FIG. 2 illustrates a leaf spring assembly 5 featuring the leaf spring stack 10 of FIG. 1. As typically found in single point suspension systems, a mounting coupling 40 is found at each end 20 of the top spring 16. Each coupling consists of a top mounting element 39 and a bottom mounting element 41 disposed above the top spring 16 and below the safety spring 22 respectively. The top mounting element 39 includes a dowel plate 42 having a dowel extending downward into a respective hole 43 through the top spring 16 near the opposite ends 20. A cradle 44 having an arcuate recess therein is mounted atop the dowel plate 42 for receiving an axle 45 of the vehicle on which the leaf spring assembly 5 is installed. The bottom mounting element 41 includes a channel member 46 and rubber pads 48. The rubber pads 48 are placed across the channel member 46 on its bottom center portion 50. The channel member 46 is longitudinally parallel to the stack 10 and positioned to receive an end portion of the safety spring 22 such that a bottom surface 52 of the safety spring sits atop the rubber pads 48 such that the uppermost three springs (the top spring 16, the safety spring 22, and the spring between them) are positioned between vertical side walls 54 of the channel member 46. These side walls 54 extend to the dowel plate 42 on the upper surface 47 of the top spring 16 on either side thereof at which point they contact the cradle 44. Here the cradle 44 and channel member 46 are connected by bolts 56. U-bolts 58 are used to further connect together the cradle 44 and the channel member 46. The curved section of the U-bolts engage around the axle 45 and pass through the cradle 44 and the channel member 46 to clamp the cradle 44 and dowel plate 42 between the axle 45 and spring stack 10.

Figure 3:
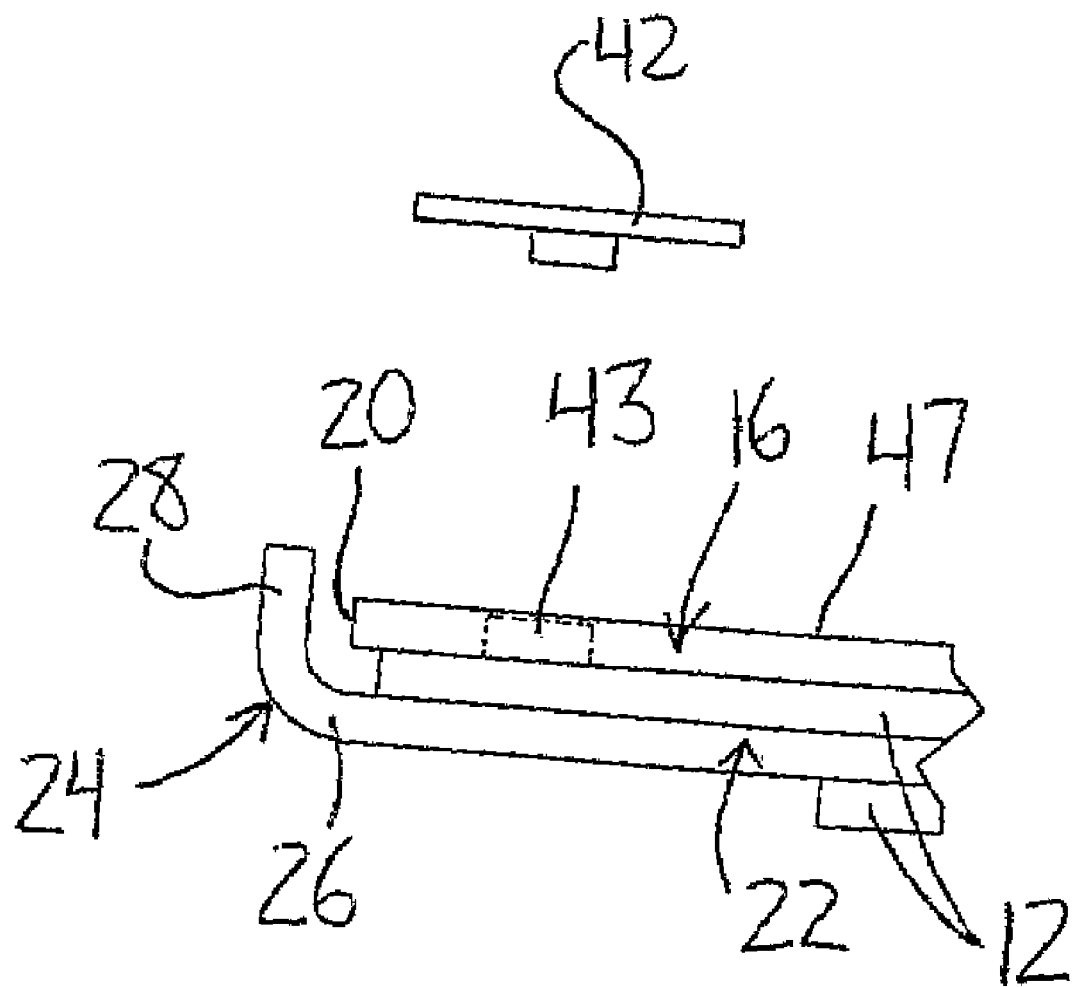
FIG. 3 is a side view of an end portion of the leaf spring stack of FIGS. 1 and 2.

In typical leaf spring assemblies of this type where the retaining elements 24 are not provided at either end 20 of the top spring 16, failure of the top spring 16 or the dowel (on the dowel plate 42) used to locate the mounting coupling 40 on the top spring 16 could cause a loss of connection between the spring stack 10 and the axle 45. With the safety spring 22 in place in the present invention, the likelihood of separation of the axle 45 and spring stack 10 is reduced. As seen in FIG. 3, the blocking portion 28 of the retaining element 24 at either end of the safety spring 22 extends upward past the top surface 47 of the top spring 16. Looking at FIG. 2, it should be appreciated that should the top spring 16 break into two pieces between the fastener 14 and the dowel receiving hole 43, the piece with the mounting coupling 40 will be prevented from sliding off the end of the spring stack 10 by the blocking portion 28 of the retaining element 24. The side walls 54 of the channel member 46 will prevent the piece from falling of either side of the stack 10 due to the enclosure of the top three springs by the mounting coupling 40. Should the dowel plate 42 fail such that the mounting coupling 40 is no longer located by the receiving hole 43, the blocking portion 28 and the retaining element 24 and the clamped arrangement of the mounting coupling 40 will act in the same way to prevent separation of the axle 45 and the spring stack 10.

The type of fastener 14 used to hold the leaf springs 12 in the stacked relationship is known to those of skill in the art. The fastener features a shaft that is passed through aligned holes in the plurality of leaf springs 12 with end portions at either end having a greater diameter than the shaft. This difference in diameter defines shoulders at the top surface 47 of the top spring 16 and the bottom surface 60 of the bottom spring between which the springs 12 are clamped. The spring located directly beneath the safety spring 22 in the stack 10 is sufficiently short to leave enough room between the end of that spring and the end of the safety spring 22 for the bottom element 41 of the mounting coupling 40.

While the present invention has been described in terms of a stack of leaf springs in a single point suspension system, it should be appreciated that the safety spring 22 can be incorporated into multiple leaf suspensions of other types where it would be desirable prevent a clamped coupling from sliding of the end of a leaf spring stack in the event of a failure. The described leaf spring assembly features mounting couplings 40 having a standard U-bolt arrangement in which the U-bolts engage around the axle 45 to clamp the top 39 and bottom 41 mounting elements to the axle 45. Alternate mounting coupling arrangements having top and bottom elements clamped together are known to those of skill in the art and can be used with the safety spring 22 according to the present invention. For example, inverted U-bolt arrangements in which the U-bolts clamp the axle between two cradles are often used in leaf spring assemblies. In addition, the mounting couplings 40 can be located on the stack 10 of springs by means other than the dowel plates 42 and corresponding holes 43.

The number of springs in the stack 10 can be altered to suit the requirements of a particular application. The safety spring 22 does not have to be positioned as the third spring from the top of the stack 10 as shown in the figures, but should be positioned on the side of the top spring 16 opposite the top mounting elements 39. Positioning the safety spring 22 near the top spring 16 helps retain a stack shape similar to a conventional stack 10 of leaf springs that narrows from the top down. It should be appreciated that positioning the safety spring 22 too low in the stack 10 would significantly interfere with this arrangement, as the safety spring 22 (including the retaining elements 24 at its ends) is the longest in the stack 10. An example of an alternate position of the safety spring 22 would be to switch the positions of the safety spring and the spring between the main and safety springs such that the safety spring 22 is adjacent the main spring 16. In such an arrangement, the bottom mounting element 41 could be positioned against the bottom surface of either the safety spring 22 or the spring below it.

In the detailed embodiment shown in the figures, the blocking portion extends 28 upward in order to block the ends of the two top springs and the top mounting element. The blocking portions 28 of the retaining elements 24 could also extend downward to block movement of the mounting couplings 40 off the ends of the stack 10. In this case, the blocking portion 28 would extend down from the extension portion 26 past the center portion 50 of the bottom mounting element 41. Clamped to the top mounting element 39, the bottom element 41 would hit the blocking portion 28 of the retaining element 24 in the event of detachment from the top spring 16, thereby preventing the mounting coupling 40 from sliding off the end 20. In other words, the retaining element 24 should be shaped and oriented to obstruct motion of the mounting coupling 40 in a direction parallel to a longitudinal axis of the stack 10 of leaf springs 12 past the ends 20 of the top spring 16. So the blocking portion 28 can extend upward, downward or both upward and downward from the extension portion 26 to serve its function.

In FIG. 2, the leaf spring assembly 5 according to the detailed embodiment of the present invention was shown in an under-slung arrangement where the stack 10 of springs 12 is supported below the axles 45. It should be appreciated that the safety retaining 22 would also function to retain the mounting coupling 40 in an over-slung arrangement in which the springs 12 are supported above the axles 45. In such an arrangement, the top 39 and bottom 41 mounting elements would switch positions above and below the top spring 16 and the safety spring would have downward extending blocking portions and would be positioned on top of the top spring 16. With the mounting couplings 40 be rotated 180 degrees from their about a longitudinal axis of the stack 10 of leaf springs 12, the holes 43 would be in the spring below the top spring 16, as the dowel plate 42 would be mounted on its lower surface. In this arrangement, the top three springs of the stack would include, from the top down, the safety spring 22, the top spring 16 and a third spring. Here the third spring from the top would be considered the main spring, as opposed to the illustrated embodiment in which the top spring 16 is the main spring. The main spring is the spring to which the mounting couplings 40 are coupled. It should be realized that the terms top and bottom refer to the orientations shown in the figures and that the spring assembly 5 can be oriented in any number of ways to suit specific applications.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A leaf spring assembly comprising:
a plurality of leaf springs held in a stacked relationship, said plurality of leaf springs comprising a main spring and a safety spring, each spring having opposite first and second surfaces and opposite ends, said springs being vertically stacked first surface to second surface and the first surface of said main spring being opposite said safety spring;
axle seats coupled to the main spring at opposite ends thereof, each axle seat comprising:
a first mounting element coupled to the main spring and disposed against the first surface thereof; and
a second mounting element disposed to a side of the safety spring opposite said main spring in opposition to said first mounting element;
said first and second mounting elements being clamped together with at least the main and safety springs therebetween; and
retaining elements each disposed at a respective one of the opposite ends of said safety spring, each of said retaining elements comprising:
an extension portion extending to a respective one of the opposite ends of the main spring; and
a blocking portion extending from the extension portion at a position therealong past the respective one of the opposite ends of the main spring to a side of the extension portion on which the main spring is located past the first surface of the main spring;
the blocking portions of the retaining elements thereby being arranged to block movement of the axle seats longitudinally off the plurality of leaf springs should at least one of the opposite ends of the main spring break off or at least one of said axle seats become uncoupled from said main spring.

2. The leaf spring assembly according to claim 1 wherein the first and second mounting elements of each axle seat are clamped together by bolts.

3. The leaf spring assembly according to claim 2 further comprising axles coupled to the leaf springs at the opposite ends of the main spring by the axle seats.

4. The leaf spring assembly according to claim 3 wherein the first mounting element of each axle seat comprises a cradle for engaging a side face of a respective one of the axles and the bolts comprise U-bolts which engage around the axle to clamp the cradle between the axle and the second mounting element.

5. The leaf spring assembly according to claim 1 wherein each first mounting element comprises a dowel plate having a dowel and the main spring has holes therein, each hole receiving a respective one of the dowels for coupling said first mounting element and said main spring.

6. The leaf spring assembly according to claim 1 wherein each second mounting element is disposed against the second surface of the safety spring.

7. The leaf assembly according to claim 6 wherein the plurality of leaf springs further comprises a third spring between the main spring and the safety spring.

8. The leaf spring assembly according to claim 1 wherein the plurality of stacked leaf springs further comprises a third spring disposed at the side of the safety spring opposite the main spring.

9. The leaf spring assembly according to claim 1 wherein the second mounting element of each axle seat comprises a channel member extending parallel to a longitudinal axis of the plurality of leaf springs.

10. The leaf spring assembly according to claim 9 wherein each channel member comprises side walls, the respective ends of at least the safety and main springs being received between said side walls, said side walls extending to the first mounting element for clamping connection thereto on opposite sides of the plurality of stacked leaf springs.

11. The leaf spring assembly according to claim 10 wherein the second mounting element of each axle seat further comprises rubber pads disposed between the channel member and the safety spring.

12. The leaf assembly according to claim 1 wherein the blocking portion of each retaining element extends between the first and second mounting elements of the axle seat at the respective end of the main spring.

13. The leaf assembly according to claim 1 wherein the retaining elements are integral to the safety spring.

* * * * *